United States Patent [19]

Leaf

[11] 3,977,700
[45] Aug. 31, 1976

[54] TANDEM AXLE SUSPENSION
[75] Inventor: Ronn J. Leaf, Lexington, Ky.
[73] Assignee: Dura Corporation, Southfield, Mich.
[22] Filed: Mar. 31, 1975
[21] Appl. No.: 563,298

[52] U.S. Cl. ................................ 280/685; 267/33
[51] Int. Cl.[2] ........................................ B60G 11/16
[58] Field of Search .............. 280/104.5 R, 104.5 A, 280/104.5 B, 81 R, 685; 267/168, 33, 153

[56] References Cited
UNITED STATES PATENTS

| | | | |
|---|---|---|---|
| 2,980,417 | 4/1961 | Pence | 267/33 |
| 3,069,149 | 12/1962 | Neff | 267/33 |
| 3,473,797 | 10/1969 | Selzer | 280/104.5 R |
| 3,746,361 | 4/1973 | McGee | 280/104.5 R |
| 3,751,063 | 8/1973 | Raidel | 280/104.5 A |
| 3,797,817 | 3/1974 | Deisenroth | 267/168 |

Primary Examiner—M. H. Wood, Jr.
Assistant Examiner—John A. Carroll
Attorney, Agent, or Firm—Hill, Gross, Simpson, Van Santen, Steadman, Chiara & Simpson

[57] ABSTRACT

A tandem axle suspension has a bracket supporting a trunnion on which a pair of beams is journaled rockably in side-by-side relation, each beam having first and second arms extending to opposite sides of the trunnion, the first beam arms projecting in opposite directions and having their distal end portions extending along a common axis and each arranged to receive an axle for a wheel located at one side of the common axis, the first beam arms having respective upwardly facing spring supports which are offset toward the opposite side of the common axis, compression springs carried upon the supports being engaged by downwardly facing thrust structure on the second beam arms. Torsional equilibrium is attained in a vertical plane through the axis of the trunnion and about the common axis of the first arms. Rotation about the common axis of the first arms is limited to avoid excessive operating stress in bushings between the trunnion and the beams, but angular conical displacement capability is provided in bushings between the axles and the first arms of the beams.

16 Claims, 6 Drawing Figures

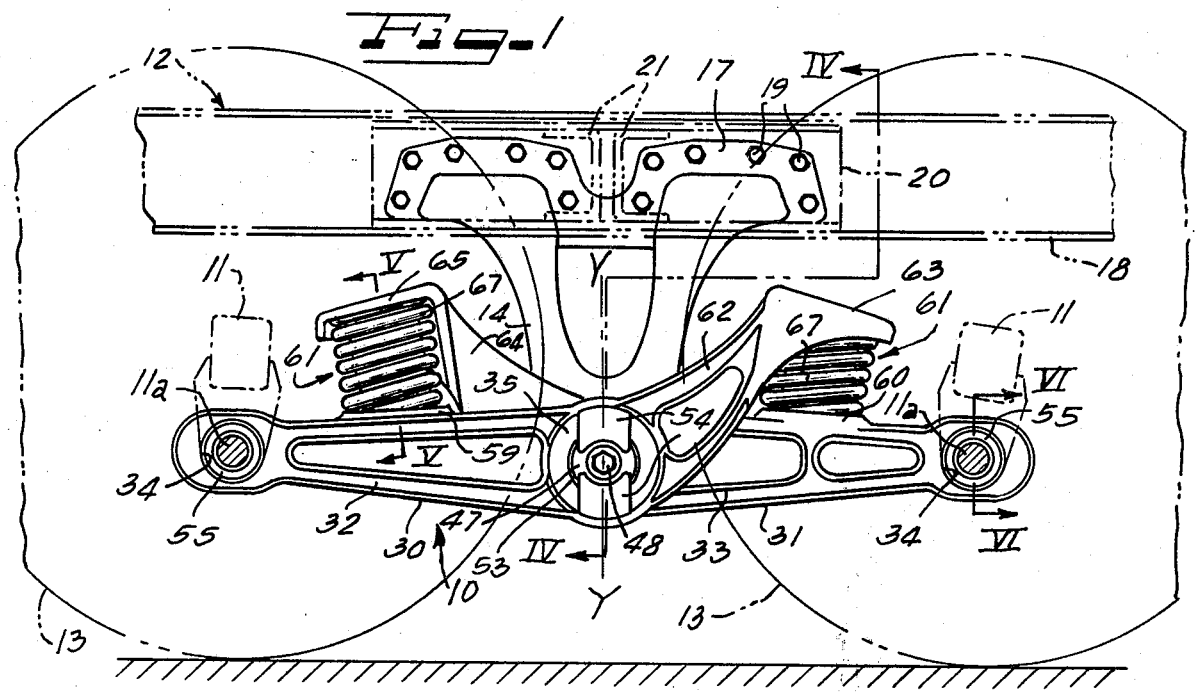
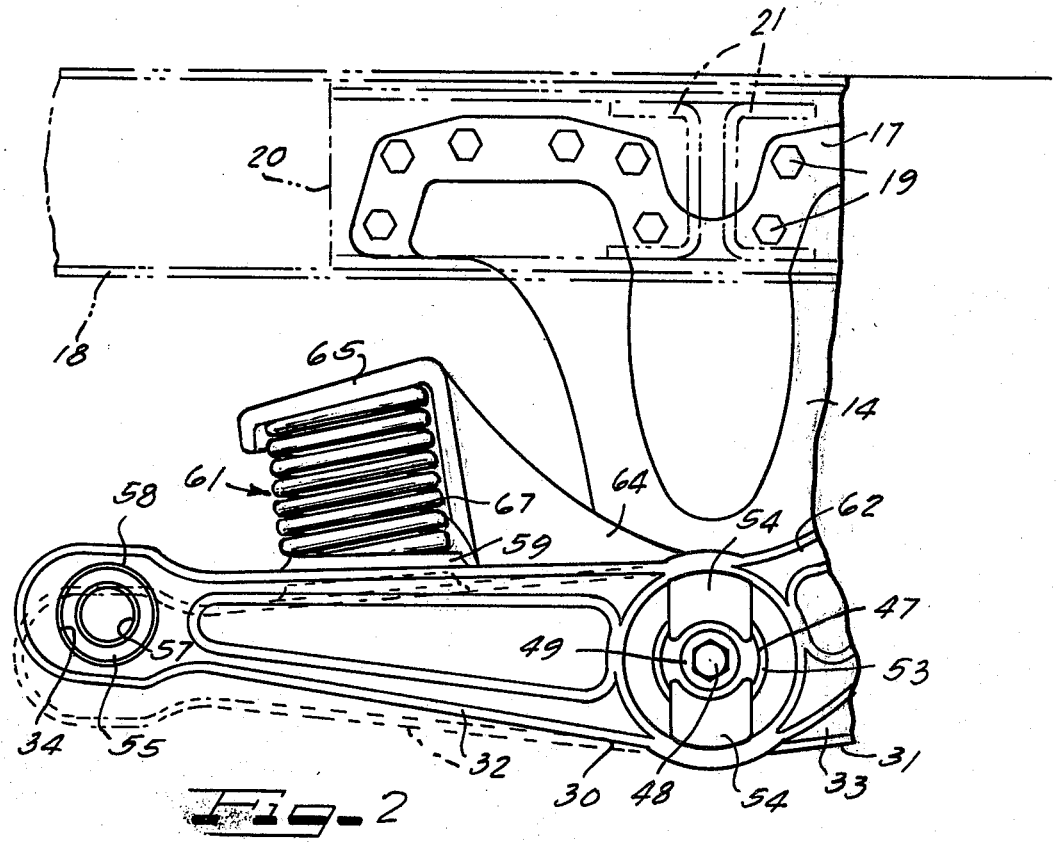

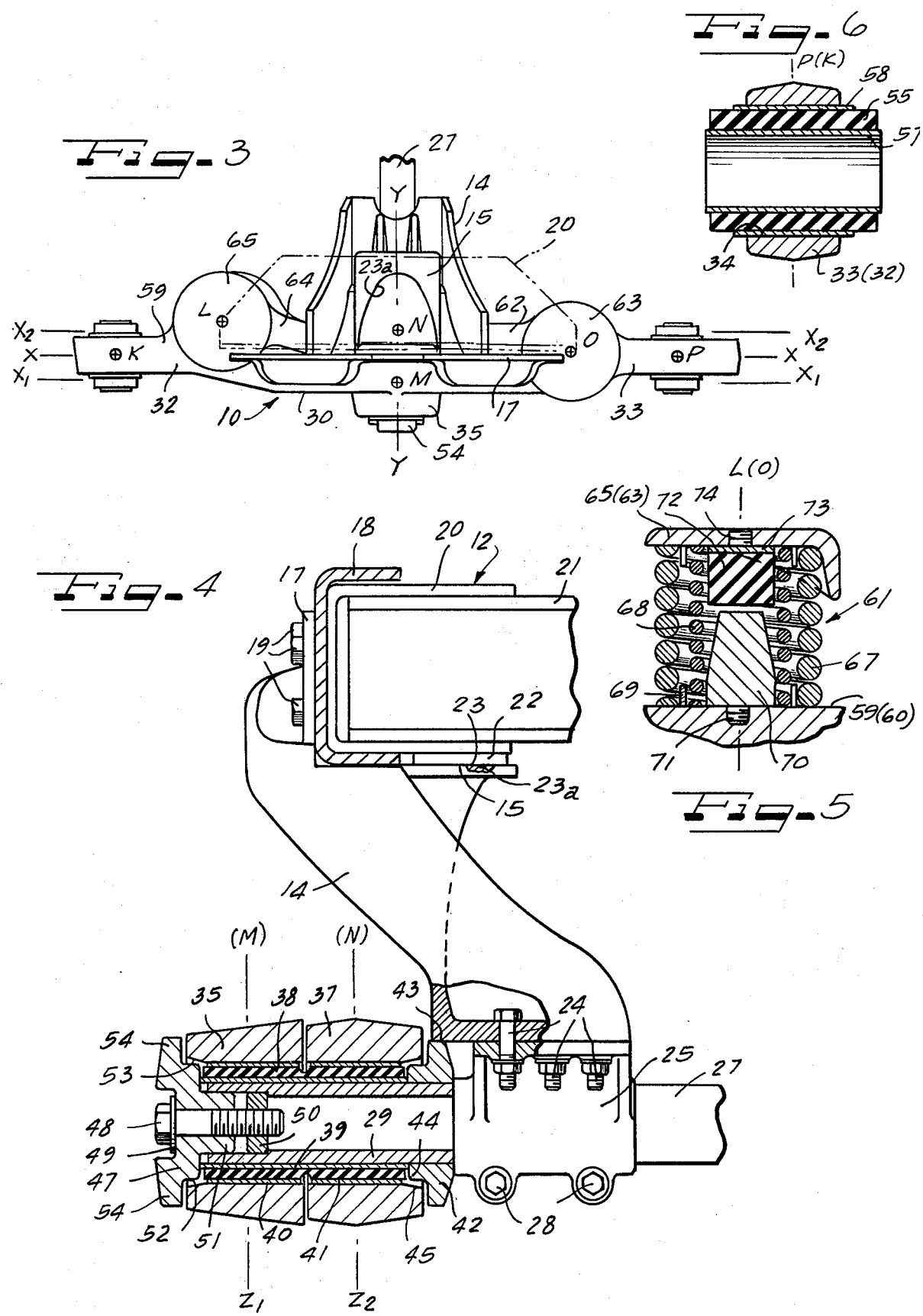

TANDEM AXLE SUSPENSION

This invention relates to tandem axle suspensions which are specially suitable for motor vehicles, trailers, and the like, and is more particularly concerned with improvements in and relating to suspensions of the kind disclosed in U.S. Pat. No. 3,746,361 assigned to the same assignee as the present application.

According to the disclosure in the identified, prior patent a tandem axle suspension has a bracket for attaching it to the frame of a vehicle and supporting a trunnion on which a pair of relatively rockable beams is journaled in side-by-side relation. Each beam has a first and a second arm extending to opposite sides of the trunnion. The first beam arms project in opposite directions and have their distal end portions extending along a common axis and each provided with means for receiving an axle for a wheel located at one side of the common axis. Each of the first arms carries in alignment with the common axis a spring support, and the second arms of the beams have thrust means bearing down on the respective springs in alignment with the common axis. Thereby is attained a rocking beam arrangement of total symmetrical loading. However, there is a tendency toward a sustained torque about the common axis of the first arms of the suspension resulting in adverse conical displacement of the trunnion bushing. These undesirable stresses result in premature failure of the bushing. It is to the alleviation of this problem that the present invention is directed.

An important object of the invention is to provide a new and improved tandem axle suspension in which torsional equilibrium is attained for journal bushing means of the suspension beams.

Another object of the invention is to improve the durability of tandem axle suspensions.

A further object of the invention is to limit the magnitude of displacement about the beam axis of dual beam tandem axle suspensions.

Still another object of the invention is to substantially equalize bushing stress between the center and end bushings of dual beam tandem axle suspensions.

According to features of the invention, there is provided a tandem axle suspension, which may also be referred to as a single point tandem axle suspension, wherein a pedestal bracket has means for attaching it to the frame of a vehicle and supports a trunnion on which a pair of beams is journaled relatively rockably in side-by-side relation, each beam having first and second arms extending to opposite sides of said trunnion, the first beam arms projecting in opposite directions and having their distal end portions extending along a common axis and each provided with means for receiving an axle for a wheel located at one side of the common axis, the first beam arms having respective upwardly facing spring supports each of which is offset a predetermined distance toward the opposite side of the common axis. Compression spring means are carried upon each of the supports. Downwardly facing thrust means are provided on each of the second beam arms, complementary to and offset in the same manner as the supports and overlying and engaging compressively upon the spring means.

According to other features of the invention means are provided for limiting operating stress on the center or trunnion bushings of the suspension and utilizing the angular conical displacement capability of the beam end axle bushings to obtain operating stress equalization in the journal and axle bushings.

A further feature of the invention resides in a new and improved multi-spring unit structure for controlling load transfer between the dual rocking beams of the tandem axle suspension.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 1 is a side elevational view, partially schematic, of a tandem axle suspension embodying features of the invention;

FIG. 2 is an enlarged fragmentary side elevational view of the suspension;

FIG. 3 is a top plane view of the suspension;

FIG. 4 is an enlarged fragmentary sectional elevational detail view taken substantially along the line IV—IV of FIG. 1;

FIG. 5 is a fragmentary enlarged sectional detail view taken substantially along the line V—V of FIG. 1;

FIG. 6 is an enlarged fragmentary sectional detail view taken substantially along the line VI—VI of FIG. 1.

In a preferred embodiment of the invention as shown in the drawings, a suspension 10 is provided for tandem axles 11 which may, as is usual extend from side to side under a vehicle represented by a chassis frame 12, the axles being coupled in any preferred manner as is well known to road running wheels 13. It will be appreciated that duplicate tandem suspensions 10 will be provided at each side of the vehicle attached to the axles 11 as by means of brackets 11a. The axles 11 may extend continuously between and be coupled to both of the duplicate suspensions. Either or both of the axles 11 may be connected in a drive transmission, as may be preferred. It will also be understood that the wheels 13 are located at the outer side of the suspension, having regard to the side of the vehicle to which the suspension is attached, the outer side of the suspension being that side which faces away from the vehicle and the inner side of the suspension facing inwardly toward the underside of the vehicle.

For attachment to the vehicle frame 12, the suspension 10 comprises a pedestal bracket 14 (FIGS. 1–4) having an upwardly facing seat 15 engaging supportingly under the frame 12 and an upwardly extending flange 17 of substantial width adapted to be secured to the outer face of a longitudinally extending frame beam 18 as by means of bolts 19. The vehicle frame beam 18 may be of generally inwardly opening channel shape provided in the area thereof engaged by the bracket 14 with an internested generally U-shaped reinforcing bar 20 within which are engaged respective end portions of cross beams 21 extending across the width of the vehicle frame and having their opposite ends similarly connected at such opposite side of the vehicle frame with similar side frame structure as the side beam 18 and the reinforcing bar 20. Desirably a metal shim pad 22 is disposed between the innermost extending portion of the seat 15 and the innermost portion of the lower flange of the reinforcing frame bar 20 and the cross beam 21 to provide a structurally sound, rigid connection of the pedestal 14 to the vehicle frame. The upper surface of the seat 15 is desirably provided with means such as an arched groove 23 into which an interlock boss 23a on the pad 22 extends interlockingly to resist planar displacement from between seat 15 and the clamping frame bar surface.

From the seat 15, the bracket 14 extends downwardly and inwardly under the frame 12. On its lower end, the pedestal bracket 14 has secured thereto as by means of bolts 24 a trunnion tube adapter 25 through which is received a trunnion member in the form of a tube 27 fixedly secured in place as by means of transversely extending bolts 28 which secure opposite sides of a split eye of the adapter in fixed cramping retaining engagement with the trunnion tube.

On a journal portion 29 of the tube 27 extending outwardly from the adapter 25 is rockably mounted in side-by-side relation a pair of beams 30 and 31. A first arm 32 of the beam 30 extends in one generally horizontal direction from the journal provided by the trunnion 29, and a first arm 33 of the beam 31 projects in the opposite direction from the journal provided by the trunnion 29. In this instance the beam 30 is disposed at the outer side of the suspension assembly and the beam 31 is disposed at the inner side of the assembly. At their distal end portions, the first beam arms 32 and 33 are constructed and arranged to extend along a common axis X (FIG. 3). Each of the arms 32 and 33 has on its distal end portion means comprising an eye 34 to facilitate coupling the associated axle bracket 11a.

Intermediate its ends each of the beams 30 and 31 has means by which it is journaled on the trunnion 29. To this end the beam 30 has a hub 35 and the beam 31 has a hub 37 (FIGS. 1 and 4). These hubs are relatively offset with respect to the axle coupling distal terminal portions of the arms 32 and 33 so that when the hubs 35 and 37 are in side-by-side slightly spaced journaled relation on the trunnion 29, the longitudinal axis X extends between the adjacent spaced ends of the hubs and midway between load centers M and N (FIGS. 3 and 4) of the hubs. Since in service a limited range of oscillation about the axis X is desirably permitted in the beams 30 and 31, an elastomeric bushing 38 is provided between the trunnion 29 and the hubs 35 and 37. In a preferred form, the bushing 38 is formed in one piece and secured between an inner one piece elongated tubular metal sleeve member 39 of a diameter to engage slidably with the trunnion 29, and respective outer diameter tubular sleeve members 40 and 41. Each of the members 40 and 41 is of a suitable diameter and length to be press fitted within the journal eyes of respectively the hub 35 and the hub 37. The adjacent ends of the member 40 and 41 are spaced apart at least as far as the normal spacing between the adjacent ends of the hubs.

Means for maintaining the bushing 38 and thereby the hubs 35 and 37 against undesirable axial displacement relative to the trunnion 29 include an inner collar member 42 engaged about the trunnion 29 and abutting the adjacent end of the adapter 25 with a flat shoulder 43 on the margin of the collar engaging against the lower end of the bracket 14 to hold the collar against turning on the trunnion. On its outer end, the collar 42 has an annular flange shoulder 44 which is engaged by the inner end of the bushing sleeve 39 and provides an annular stop shoulder of predetermined smaller diameter than a surrounding inner end frostoconically flared recess shoulder 45 within the journal eye of the hub 37.

At its opposite end, the bushing sleeve 39 extends slightly beyond the outer end of the trunnion 29 and is firmly engaged by an end cap and clamping member 47 which is drawn up tightly against the end of the sleeve by means of a bolt 48. The bolt extends axially through the cap 47 with its head bearing against a washer 49 and its threaded inner end portion engaged through a tapped anchoring member 50 spaced inwardly from the outer extremity of the trunnion 29 and fixed as by welding or staking. For maintaining the end cap 47 centered relative to the trunnion axis, the cap has an inwardly projecting boss 51 fitting telescopically within the outer end portion of the trunnion. An annular shoulder 52 on the end cap 47 extends into a frostoconically flared tapered annular outwardly opening recess shoulder 53 of slightly larger diameter in the outer end portion of the journal eye of the hub 35, similarly as the shoulder 44 projects into the recess shoulder 45. These shoulders 44 and 52, cooperating with the shoulders 45 and 53, provide annular stops to limit angular deflections of the beams 30 and 31 and more particularly the hubs 35 and 37 relative to the trunnion 29. Thus, the shoulder 52 serves as an annular stop to limit deflections of the beam 30 about a longitudinal axis $X_1$ and an axis $Z_1$ which extends vertically through the load center M. To the same effect, the shoulder 44 which opposes the shoulder 45 limits deflections of the suspension beam 31 about a longitudinal axis $X_2$ and a vertical axis $Z_2$ through the load center N related to the hub 37. Limitation upon deflections about the $Z_1$ and $Z_2$ axes is related to axle track. By limiting the magnitude of such deflections, the vehicle axles are maintained in their true position relative to the chassis longitudinal centerline.

Such limitation upon deflection also has a beneficial result in limiting conical angular deflections of the beam bushing 38 resulting in lower maximum operating stresses, thereby prolonging bushing life.

Further implementing preservation of center bushing life, by limiting deflections about the $X_1$ and $X_2$ axes and thereby limiting rotation about the X axis related to axle articulation relative to the chassis, is transfer to and sharing of deflection stresses by respective beam end bushings 55 (FIGS. 1, 3 and 6) of preferably elastomeric structure and engaged between an inner diameter axle bracket receiving sleeve 57 and an outer diameter shorter sleeve 58 which is press fitted into the respective eye bore 34 of the associated suspension beam. By thus transferring some of the deflection stresses to the beam end bushings 55, and utilizing the full angular conical displacement capability of the beam end bushings, substantial extension of center bushing life is attained.

Undesirable stress distribution in the bushings 38 and 55 is avoided by new and improved means attaining torsional equilibrium at each bushing by locating compression springs on load centers which are offset from the center axis X toward the inner side of the suspension. To this end, the arm 32 of the beam 30 is provided intermediate its ends with an upwardly facing spring platform support 59, and the arm 33 of the beam 31 is provided with an upwardly facing spring platform support 60. Each of the supports 59 and 60 is offset to the inner side of the suspension a predetermined distance from the axis X. Compression spring means 61 are carried upon each of the supports 59 and 60.

A second arm 62 of the beam 30 projecting in the opposite direction from the arm 32 has means comprising a downwardly facing thrust pad 63 complementary to and offset to the inner side of the suspension in the same manner as the support 60 and overlies and engages compressively upon the spring means 61. Similarly, the beam 31 has a second arm 64 which projects in the opposite direction from the arm 33 and has downwardly facing thrust pad 65 complementary to and offset to the inner side of the suspension in the same manner as the support 59 and overlying and engaging compressively upon the spring means 61 associated therewith. In an especially efficient arrangement, the load center O (FIG. 3) for the support 60 and the pressure pad 63 and the interposed spring assembly 61 is offset inwardly relative to the axis X the same distance as the load center L for the spring support 59 and the pad 65 and the interposed spring 61 is offset inwardly relative to the axis $X_2$. It may also be noted that the load center O is offset inwardly relative to the longitudinal axis $X_1$ substantially the same distance as the load center L is offset inwardly relative to the longitudinal axis X. This establishes the preferred geometry attaining improved torsional equilibrium in the bushings.

Each of the spring means 61 comprises any suitable structure which will permit relative rocking articulation of the beams 30 and 31 by compression of the spring means in service operation of the suspension, as exemplified by the full line and dash line positions of the arm 32 of the beam 30 in FIG. 2. It will be appreciated that there is an equal and opposite relative movement of the arm 33 of the beam 31 and concurrent coordinated movement of the arms 62 and 64.

In one preferred form, the spring means 61 comprise springs in parallel and series arrangement, as best seen in FIG. 5. This arrangement comprises an outer relatively stiff load supporting helical compression spring 67 of suitable length encompassing in spaced relation a smaller diameter helically coiled load supporting compression spring 68 of differentially lesser load supporting capacity, with a spacer ring 69 between the base coils of the springs. A central generally frostoconical centering member 70 within the spring 68 and shorter than the springs is secured as by means of an integral threaded stud 71 to the support 59 or 60 with which associated. In addition, the member 70 serves as a bumper or stop having its crown normally in spaced relation to a superposed spring 72 auxiliary to the springs 67 and 68 and desirably comprising an elastomeric block carried in bonded relation on a head plate 73 provided with a threaded stud 74 by which it is attached to the thrust pad 65 or 63 with which associated.

From the foregoing it will be appreciated that the present invention attains a new and improved and advantageous location of the load centers of the suspension 10, best visualized in FIG. 3, comprising the load centers M and N at the center bushing, the load centers L and O at the compression springs and load centers K and P at the respective end bushings. The depicted orientation and relationship of the load centers attains efficient torsional equilibrium in the Y plane (FIGS. 1 and 3) through the trunnion axis and about the X axis. Bushing life is significantly and efficiently preserved and extended.

It will be understood that variations and modifications may be effected without departing from the spirit and scope of the novel concepts of this invention.

I claim as my invention:

1. In a tandem axle suspension including a bracket having means for attaching it to the side of a vehicle frame and supporting a trunnion to project outwardly relative to the frame, a pair of beams journaled relatively rockably in side-by-side relation on the trunnion, each beam having first and second arms arranged to extend to opposite sides of said trunnion and longitudinally relative to the frame, said first beam arms projecting in opposite directions and having their distal end portions extending along a common axis and each provided with means for attaching an axle for a wheel to be located at the outer side of the suspension, the improvement comprising:
   said first beam arms having respective upwardly facing spring supports each of which is offset to the inner side of the suspension a predetermined distance from said common axis;
   compression spring means carried upon each of said spring supports; and
   downwardly facing thrust means on each of said second beam arms complementary to and offset to the inner side of the suspension in the same manner as said spring supports and overlying and engaging compressively upon the spring means.

2. A suspension according to claim 1, wherein the beams comprise an outer and an inner beam having respective hubs journaled on said trunnion with their load centers equally spaced at respectively opposite sides of said common axis, said spring support on the first arm of the inner beam being offset relative to the journal load center of the outer beam substantially the same distance as the load center of the spring support on the first arm of the outer beam is spaced from said common axis.

3. A tandem axle suspension according to claim 1, wherein said beams comprise an inner beam and an outer beam having journal hubs about said trunnion with their load centers equally spaced from said common axis, the compression means carried by the support of the first arm of the inner of said beams being offset from said common axis substantially the same distance as the load center of the compression spring carried by the support of said first arm of the outer of the beams is spaced from a longitudinal axis through the load center of the journal hub of the inner of the beams.

4. A tandem axle suspension according to claim 1, wherein one of said beams is located at the outer side of the suspension and the other of the beams is located at the inner side of the suspension, said beams having respective journal hubs having their load centers spaced respectively equally from said common axis, the spring support of the outer beam first arm and the spring means thereon as well as the thrust means of the second beam arm of the inner of the beams having a load center spaced inwardly relative to the load center of the journal hub of the inner of the beams, and the spring support of the first beam arm of said inner beam with the compression spring means thereon and the downwardly facing thrust means of said second beam arm of the outer beam having a load center located inwardly relative to said common axis but outwardly relative to the load center of the journal hub of said other and inner of the beams.

5. A tandem axle suspension according to claim 1, wherein said beams have journal hubs, said hubs being in spaced adjacency whereby to permit individual rocking movement of the arms relative to said common axis, and bushing means between said hubs and said trunnion comprising a one-piece sleeve engaging the trunnion and individual length tubular elements engaging each of the hubs respectively with elastomeric bushing means extending between said sleeve and said tubular elements.

6. A tandem axle suspension according to claim 5, including shoulder members carried by the trunnion and clamping said sleeve therebetween and including annular shoulder means opposing annular shoulder means on the hubs normally spaced but serving as stops to control rolling movement of the beams about said common axis and relative to a vertical plane through the axis of said trunnion.

7. A tandem axle suspension according to claim 6, wherein said annular shoulders extend into frostoconically tappered recesses in the adjacent ends of the respective hubs and which recesses provide annular shoulder surfaces opposing the annular shoulders of the shoulder members.

8. A tandem axle suspension according to claim 6, wherein said means for receiving an axle on each of the distal end portions comprise an elastomeric axle bushing and said axle bushings sharing torque stresses when roll of the arms is stopped by said shoulders.

9. A tandem axle suspension according to claim 1, wherein said compression spring means comprises a pair of compression coil springs in parallel, and auxiliary spring means mounted within said coil springs.

10. A tandem axle suspension according to claim 9, including a spacer ring between said coil springs, a stop member mounted fixedly on the spring support and maintaining the coil springs centered, and said auxiliary spring comprising an elastomeric spring element mounted on the thrust means.

11. In a random axle suspension including a pedestal bracket having means for attaching it to the side of a vehicle frame and supporting a trunnion to project outwardly relative to the frame, a pair of beams having hubs journaled relatively rockably in side-by-side relation on the trunnion, said beams having first arms extending in respectively opposite directions from the hubs and second arms extending in opposite direction from the first arms of each beam, said first beam arms having distal end portions extending along a common axis and each provided with means for attaching an axle for a wheel to be located at the outer side of the suspension, and compression spring means carried by each of said first arms and engaged in thrusting relation by the second arms, the suspension comprising:
elastomeric bushing means between said hubs and said trunnion permitting rocking of said beams about the axis of said trunnion and also permitting roll of said beams about said common axis;
elastomeric bushing means carried by said axle attaching means and arranged to have respective axle brackets engaged therewith; and
means limiting roll of said beams about said common axis and thereby limiting torque stresses on the hub bushing means and effecting torque stress load transfer to said axle bracket engageable bushing means.

12. A tandem axle suspension according to claim 11, wherein said roll limiting means comprise respective normally spaced apart shoulders carried by the trunnion and complementary shoulders on the hubs.

13. A tandem axle suspensions according to claim 11, wherein said compression spring means have load centers offset inwardly relative to said common axis.

14. A tandem axle suspension according to claim 13, wherein the load center of the spring means carried by the outer of the beams is located farther inwardly offset from said common axis than the load center of the spring means carried by the inner of the beams.

15. In a tandem axle suspension including a bracket having means for attaching it to the side of a vehicle frame and supporting a trunnion to project outwardly relative to the frame, a pair of beams journaled relatively rockably in side-by-side relation on the trunnion, each beam having first and second arms arranged to extend to opposite sides of said trunnion and longitudinally relative to the frame, said first beam arms projecting in opposite directions and having their distal end portions extending along a common axis and each provided with means for receiving an axle for a wheel at the outer side of the suspension, said suspension comprising:
upwardly facing spring supports on said first beam arms;
downwardly facing thrust means on each of said second beam arms complementary to and facing toward said spring supports; and
compression spring assemblies mounted on said supports and engaged in downwardly thrusting relation by said thrust means, each of said spring assemblies comprising:
a pair of differential diameter coiled compression springs in centered spaced relation having their lower ends on said supports and their upper ends engaged by said thrust means and operating in parallel; and
auxiliary spring means located inside of the inner of said coiled compression springs;
said auxiliary spring means comprising a rigid metal stop bumper carried by and projecting upwardly on said support in each instance and an elastomeric spring block carried by the thrust means in each instance and normally spaced from said bumper, said metal stop bumper being longer than said elastomeric spring block.

16. A suspension according to claim 15, including a spacer ring located between and maintaining said compression springs in spaced concentric relation, and said rigid bumper maintaining the compression springs centered on an axis through said support in each instance.

* * * * *